(12) United States Patent
Behnke et al.

(10) Patent No.: US 7,670,218 B2
(45) Date of Patent: Mar. 2, 2010

(54) PROCESS AND DEVICE FOR CONTROLLING WORKING PARTS OF A COMBINE HARVESTER

(75) Inventors: Willi Behnke, Steinhagen (DE); Joachim Baumgarten, Beelen (DE); Werner Fitzner, Sassenberg (DE)

(73) Assignee: Claas Selbstfahrende Erntermaschinen GmbH, Harsewinkle (DE)

( * ) Notice: Subject to any disclaimer, the term of this patent is extended or adjusted under 35 U.S.C. 154(b) by 404 days.

(21) Appl. No.: 11/684,127

(22) Filed: Mar. 9, 2007

(65) Prior Publication Data

US 2007/0149265 A1 Jun. 28, 2007

Related U.S. Application Data

(62) Division of application No. 11/008,555, filed on Dec. 9, 2004.

(30) Foreign Application Priority Data

Dec. 19, 2003 (DE) ................... 103 60 597

(51) Int. Cl.
*A01F 75/18* (2006.01)
*A01D 12/16* (2006.01)
*A01D 21/00* (2006.01)
(52) U.S. Cl. .......................................... 460/4
(58) Field of Classification Search ............ 701/50, 701/1, 36; 460/4; 56/10.2 R
See application file for complete search history.

(56) References Cited

U.S. PATENT DOCUMENTS

| 4,441,513 | A | * | 4/1984 | Herwig | 460/1 |
| 6,053,811 | A | * | 4/2000 | Johnson et al. | 460/6 |
| 6,941,736 | B2 | * | 9/2005 | Freeman | 56/10.2 |
| 6,962,526 | B2 | * | 11/2005 | Ho et al. | 460/1 |
| 7,074,125 | B2 | * | 7/2006 | Ho et al. | 460/6 |
| 2003/0066277 | A1 | * | 4/2003 | Behnke | 56/10.2 |
| 2003/0216158 | A1 | * | 11/2003 | Bischoff | 460/6 |
| 2005/0208987 | A1 | * | 9/2005 | Ho et al. | 460/1 |

\* cited by examiner

*Primary Examiner*—Árpád Fábián-Kovács
(74) *Attorney, Agent, or Firm*—Michael J. Striker

(57) ABSTRACT

The process and device for controlling at least one operating condition parameter (54) of working parts (45) of a combine harvester (1) has at least one sensing device (36, 40) for monitoring a crop tailings stream (31) and for generating a grain tailings signal (X) and a tailings flow rate signal (Y) for control of the operating condition parameters (54), such as blower speed, upper sieve mesh, lower sieve mesh, so that changes in the crop harvesting conditions can be reacted to rapidly and efficiently. The device includes an evaluating and display unit (39), which includes a controller (53) for automatically controlling operating condition parameters or for displaying control information produced by control algorithms (56 to 58), so that the operating condition parameters can be optimized according to the grain tailings signal (X) and tailings flow rate signal (Y).

8 Claims, 5 Drawing Sheets

PROCESS AND DEVICE FOR CONTROLLING WORKING PARTS OF A COMBINE HARVESTER

CROSS-REFERENCE

This application is a division of U.S. patent application Ser. No. 11/008,555 filed on Dec. 9, 2004. The invention described and claimed hereinbelow claims the benefit of priority from application Ser. No. 11/008,555.

The invention described and claimed hereinbelow and in U.S. patent application Ser. No. 11/008,555 is also disclosed in German Patent Applications DE 1032604597.5 filed on Dec. 19, 2003, which provides the basis for a claim of priority of invention under 35 USC 119(a)-(d).

BACKGROUND OF THE INVENTION

1. Field of the Invention

The present invention relates to a process for controlling one or more operating condition parameters of working parts of a combine harvester, in which the working parts comprise a threshing device or part, a separating part associated with the threshing device, at least one cleaning unit including cleaning parts and at least one tailings device in working connection between the at least one cleaning unit and the threshing device. The present invention also relates to a device performing this process for controlling the one or more operating condition parameters of the working parts of the combine harvester.

2. Related Art

A number of systems for detecting grain losses, which use the grain loss information for subsequently changing certain operation condition parameters of the working parts of a combine harvester, are known in the prior art. Thus EP 0 339 141, for example, discloses a system, in which the grain detection devices are arranged at different positions within the combine harvester for detection of different grain streams. Subsequently grain loss values, which act as indicators for changes of diverse operating parameters of the combine harvester for the operator of the combine harvester, are derived by computational algorithm from the obtained information. EP 0 728 409, among others, discloses a system for automatic control of a section within the combine harvester according to the detected grain losses in order to make the required changes of the operating condition parameters due to the detected grain losses independent of the knowledge and abilities of the operator. These types of processes, above all, have the disadvantage that the grain losses are detected after the crop has passed through the combine harvester, so that it reacts in a delayed or late fashion to the changing separating conditions.

SUMMARY OF THE INVENTION

It is thus an object of the present invention to develop a process and associated device, which observes the changing harvest conditions sooner and thus permits an efficient adjustment of the operating condition parameters of the agricultural machine to these changing conditions.

These objects and others, which will be made more apparent hereinafter, are attained in a process for controlling one or more operating condition parameters of at least one working part of a combine harvester, the at least one working part comprising a threshing device, a separating unit associated with the threshing device, at least one cleaning unit including cleaning parts and at least one tailings unit for working connection of the at least one cleaning unit with the threshing device.

According to the invention this process comprises coordinating or assigning at least one sensing device to monitor a crop tailings stream and generating tailings stream signals for control of the one or more operating condition parameters of the at least one working part with at least one sensing device.

Correspondingly in the device according to the invention the at least one tailings unit is associated with the at least one sensing device for monitoring a crop tailings stream and tailings stream signals generated in the at least one sensing device are transmitted to an evaluating and display unit comprising at least controller, wherein the tailings stream signals form set values for control to optimize one or more of the operating condition parameters.

Since the tailings unit of the combine harvester is associated with at least one sensing device for monitoring the crop tailings stream and the tailings stream signals generated by the at least one sensing device are referred to for control of the one or more operating condition parameters of the at least one working part of the combine harvester, a rapid and efficient reaction to changing harvesting conditions is guaranteed.

An especially effective control results when the at least one working part is at least one cleaning unit underlying the very complex assembly and the operating condition parameters are the cleaning blower speed, the upper sieve mesh and the lower sieve mesh.

The precision of the regulation can be increased especially when the tailings stream signals are a measure of the tailings grain fraction as well as the tailings flow rate, since both parameters are indicators of the harvest conditions and thus the operating efficiency.

So that the control according to the invention can be performed in a simple manner the sensing device includes an evaluating and display unit, which receives and detects the tailings stream signals depending on the operating condition parameters of the at least one cleaning unit.

In an advantageous embodiment of the invention known sensors for detecting grain loss are provided in the combine thresher, which permit detection of separating losses and cleaning losses depending on different operating condition parameters. This especially has the advantage that the operator is informed regarding the effect of the control on the grain losses.

An especially simple version of the process according to the invention results when the evaluation and control unit has a controller in which editable control algorithms are stored, which optimize different operating condition parameters of the working parts according to the tailings grain fraction and the tailings flow rate. The flexibility of the control is still further increased when the control algorithms are specially tailored to the different operating condition parameters to be optimized.

A preferred embodiment, which considers operator comfort, results when the controller automatically selects the control algorithm or algorithms to be used to optimize the operating condition parameters. Also the control process is thus independent of special knowledge of the operator of the agricultural machine.

In order to further improve the quality of the control the stored control algorithms consider crop specific parameters, such as the crop throughput, the crop type and the crop properties, since the adjustment of the different operating condition parameters are influenced proportionally by the crop specific parameters.

In the simplest embodiments the controller and thus the control process can be started or put in operation by the operator of the combine thresher. Advantageously the tailings grain fraction and the tailings flow rate measured by the sensing device at the start of the control process form the set values and thus the operating or working point of the control process.

In the simplest case the control process is started and the controller is put into operation manually by operator action. The operator starts the controller and the control process and then selects a working point with reduced grain losses and with sufficient grain cleanness with the help of the measured grain losses displayed for him or her, the so-called subjective cleanness horizon.

So that the operator of the combine thresher has optimum conditions for deciding which operating point to select for the control process, it is advantageous when the combine thresher performs a so-called calibration motion with approximately constant speed and/or approximately constant throughput prior to starting the control process.

An especially efficient optimization of the lower sieve mesh results when the control algorithm provided for that purpose increases the lower sieve mesh when the tailings grain fraction and the tailings flow rate both increase and analogously decreases the lower sieve mesh when the tailings grain fraction and the tailings flow rate both decrease, until the predetermined set values for the tailings grain fraction and the tailings flow rate are at least approximately reached.

Because of the different effects of the various operation condition parameters on the crop material separation an effective optimization of the upper sieve mesh is attained when the control algorithm provided for that purpose decreases the upper sieve mesh when the tailings grain fraction decreases and the tailings flow rate increases and analogously increases the lower sieve mesh when the tailings grain fraction increases and the tailings flow rate decreases, until the predetermined set values for the tailings grain fraction and the tailings flow rate are at least approximately reached.

An especially efficient optimization of the cleaning blower speed results when the control algorithm provided for that purpose operates to increase or increases the blower speed when the tailings grain fraction increases and the tailings flow rate decreases and to decrease or decreases the blower speed when the tailings grain fraction increases and the tailings flow rate simultaneously increases, until predetermined set values for the tailings grain fraction and tailings flow rate are reached. Because of the complex connection between the cleaning blower speed and the separating efficiency it is advantageous when the control algorithm decreases the blower speed when both the tailings flow rate and the tailings grain fraction decrease and increases the blower speed when the tailings flow rate increases and the tailings grain fraction decreases, until the predetermined set values for the tailings flow rate and the tailings grain fraction are again reached.

An additional relief of the operator of the combine thresher results when the optimized operating condition parameters are automatically set in the appropriate working parts in an advantageous further embodiment of the invention.

So that controller does not over-supply the adjusting systems or permits an only significant adjustments for reasonable control operation, upper and/or lower limiting values can be provided to limit the values of the operating condition parameters to be optimized by the controller. Under similar considerations the control algorithms can refer to or consider so-called disturbance condition variables and associated tolerance ranges. The control process is then interrupted or terminated, when they are over-shot or under-shot and then the operator is required to input a new operating or working point. Especially significant disturbance condition variables include the crop properties, the ratio of grain throughput to tailings flow rate and the ratio of grain throughput to crop layer height.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
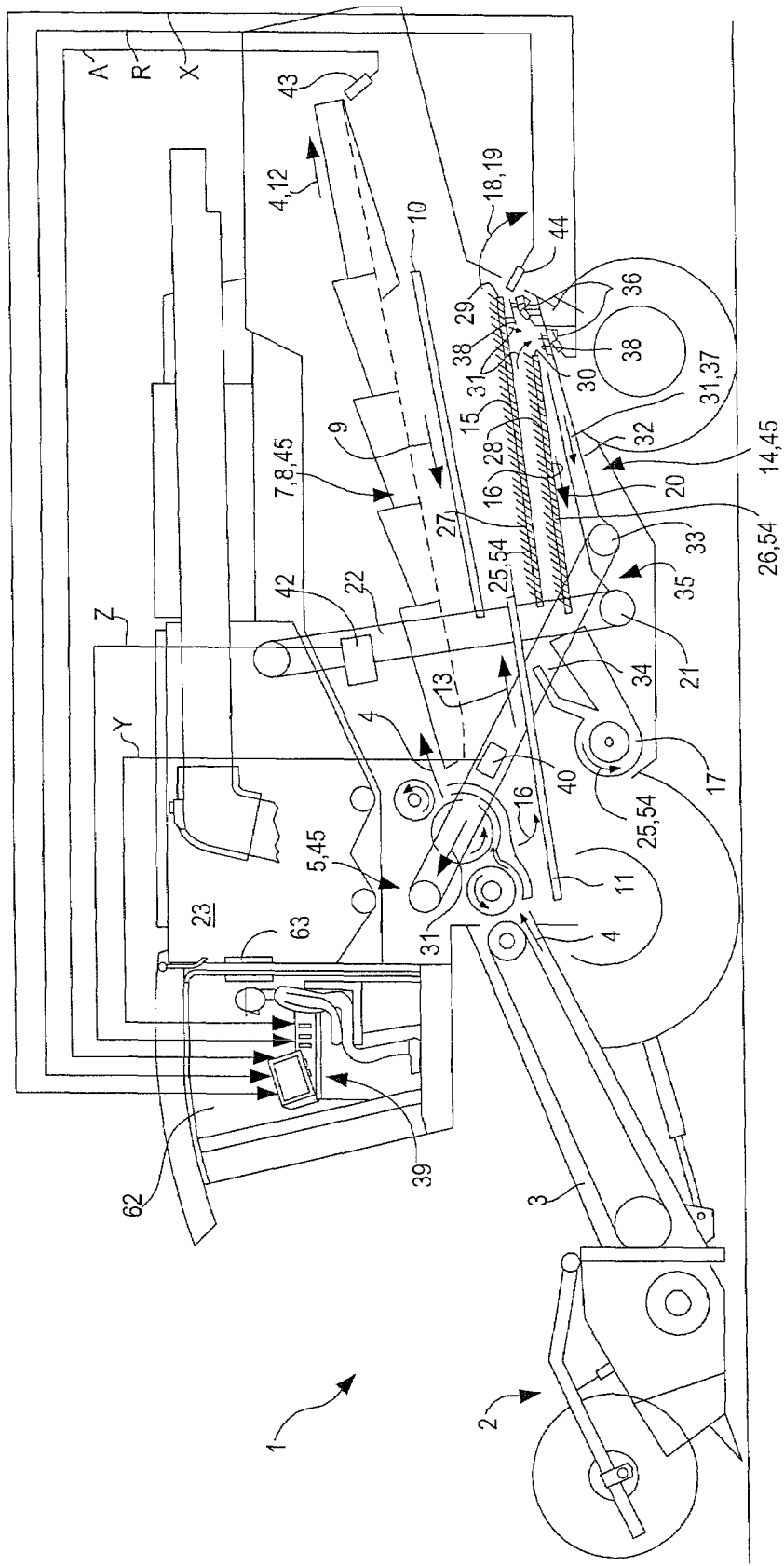
FIG. 1 is a side elevational view of a combine harvester include the device for control of operating condition parameters according to the invention.
Figure 2:
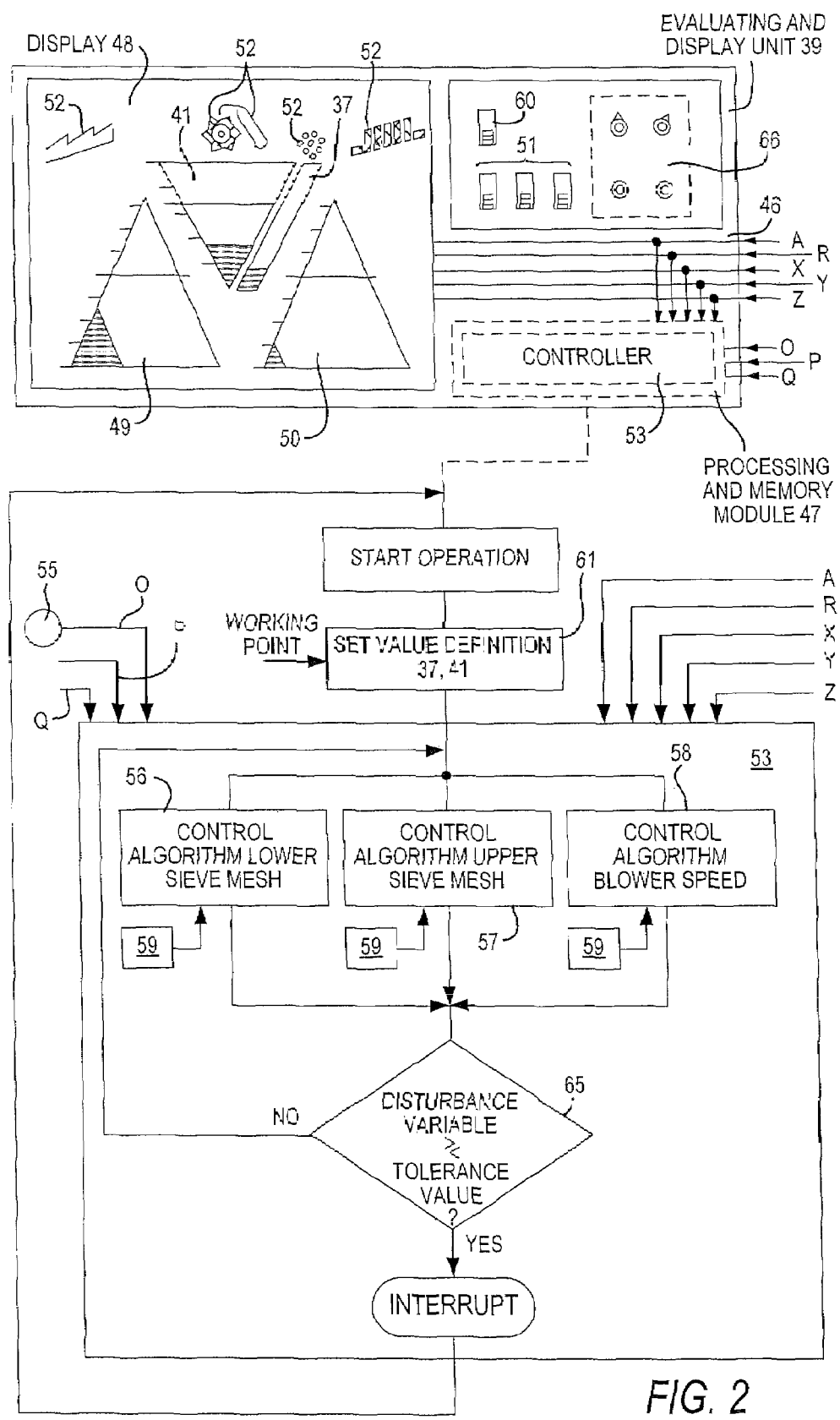
FIG. 2 is a block diagram of a process according to the invention for controlling operating condition parameters of working parts of the combine harvester shown together with a plan view of the front of an evaluating and display unit including a controller for the process.

A combine harvester 1 is shown in FIG. 1, which comprises a feed rake 3 and a cutter head 2 on the front end of the feed rake 3. The feed rake 3 conveys the harvested crop stream 4 harvested by the harvesting tool 2 to the rear into a threshing device 5, in which a first partial crop stream 6 comprising grain, unthreshed ears, short straw and chaff is separated. The remaining harvested crop stream 4 arrives in a rear part of the threshing device 5 in whose lower section an additional partial crop stream 9 likewise comprising grain, unthreshed ears, short straw and chaff is separated by a separating unit 8 constructed as a shaker tray 7. While the separated additional partial crop stream 9 on the shaker tray 7 is fed to the grain pan 11 via a return pan 10, the first partial crop stream 6 separated by the threshing device 5 reaches the grain pan 11 directly. The harvested crop stream 4 comprising the separated waste 12, which now comprises straw and a small residual grain fraction, is fed out from the combine harvester 1.

The partial crop steams 6, 9 reaching the grain pan 11 are conveyed as common harvested crop steam 13 to the cleaning unit 14 downstream of the grain pan 11. The cleaning unit 14 is formed in a known way from cleaning sieves, namely the upper sieve 15 and the lower sieve 16, arranged graded with respect to each other in a vertical direction and at least one cleaning blower 17 supplying an air stream through the sieve arrangement 15,16. The usually vibrating, sieve arrangement 15, 16, through which air flows, separates the harvested crop flow 13 conveyed to it from the grain pan 11 into a grain component and a non-grain component. The crop stream 19 comprising the so-called cleaning losses 18, which include predominantly short straw, chaff and a small amount of grain, is fed out from the combine harvester 1 in a rear part of the cleaning unit 14.

An additional grain stream 20 comprising grain and a small additional component passing through the sieve arrangement 15, 16 is fed to the grain tank 23 in a known way by means of a feed screw device 21 and a grain elevator 22 for storage of the grain stream 20. The amount and composition of the grain stream 20 passing through the cleaning sieve 15, 16 can, on the one hand, be influenced by a change of the cleaning blower speed 24 and a change of the width of the passages or gaps 25, 26 between neighboring plates 27, 28 of the individual cleaning sieves 15, 16, the so-called upper sieve mesh 25 and/or lower sieve mesh 26. From the state of the art it is known that the efficiency of the cleaning unit 14 can be adjusted or influenced so that the vibration frequency of the cleaning sieves 15, 16 is changeable or the sieve surfaces 29, 30 associated with the sieve arrangement 15, 16 are exchangeable according to the structure of the harvested crop to be cleaned. The different sieve surfaces 29, 30 differ in the size of their passages.

The upper sieve plates 27 have a greater spacing or distance from each other at the rear end of the upper sieve 15. The purpose of this greater mesh 25 is especially to separate the unthreshed ears and grain still provided with glumes and/or awn in this region above the upper sieve 15. At the same time grain, short straw and chaff, which together form a so-called crop tailings stream 31 that does not leave the combine harvester 1, are separated in this region and the rear region of the lower sieve 16. This crop tailings stream 31 is fed along a guide surface 32 to a crop screw conveyor 33, which conveys the crop tailings stream 31 to another crop elevator 34, which subsequently feeds it back to the threshing device 5. The so-called tailings device or unit 35 comprises devices determining the path of the crop tailings stream 31, the rear region of the sieve arrangement 15, 16, the guide surface 32, the crop screw conveyor 33 and the crop elevator 34. According to the invention grain flow measuring devices 36 are arranged in the rear region of the cleaning sieves 15, 16, which measure the fraction of the grain in the crop tailings stream 31, the tailings grain fraction 37, in a manner that is still to be described. In the simplest case the grain flow measuring devices 36 are formed by a plurality of sensor rods or bars 38 arranged spaced from each other along the width of the cleaning sieves 15, 16 and known in themselves. These sensor rods or bars 38 register the contacts with grain contained in the crop tailings stream 31 according to a sound conduction principle and generate grain tailings signals X proportional to the grain tailings fraction 37 in a known manner. The grain tailings signals X are transmitted to an evaluating and display unit 39 to be described in more detail hereinbelow. Also volume flow rate sensing device 40, which is known and will not be described further here, is associated with the crop elevator 34. The volume flow rate sensing device 40 can detect the tailings flow rate 41 of the tailings conveyed by the crop elevator 34. It generates a tailings flow rate signal Y accordingly, which is likewise supplied to the evaluating and display unit 39. Details of an arrangement of this sort are disclosed in DE 103 43 916.1.

An additional volume flow rate sensing device 42 for detecting grain flow through the first grain elevator 22, which is known in itself and not described in further detail here, is associated with the first grain elevator 22 of the combine harvester 1. This additional volume flow rate sensing device 42 produces a grain signal Z, which is likewise fed to the evaluating and display unit 39. Also so-called grain loss sensors 43, 44 cover the crop streams or flows 4, 19 issuing from the combine harvester 1 from their respective outlets. These grain loss sensors are knock or impact sensors operating according the sound conduction principle and are known in themselves. The grain still contained in these crop streams 4, 19 is detected by the grain loss sensors 43, 44 and these separator loss signals A and cleaning loss signals R are transmitted to the evaluating and display unit 39.

According to the previous explanation the threshing device 5, the separating unit 8 and the cleaning unit 14 form the working parts 45 according to the invention, which are integrated in the combine harvester 1. In other embodiments within the scope of the invention the threshing device 5 and/or the separating unit 8 can be replaced by rotating threshing and/or separating rotors in a manner that is known in itself and not described in further detail herein.

Subsequently the process and device for performing it according to the invention are described with the help of FIGS. 2 to 5. According to FIG. 2 the evaluating and display unit 39 comprise an input module 46, a processing and memory module 47 and a graphic display unit 48. The separator loss signal A, cleaning loss signal R, grain tailings signal X, tailings flow rate signal Y and the grain signal Z transmitted to the evaluating and display unit 39 are further processed by the processing and memory module 47 and transmitted to the graphic display unit 48, so that the separator losses 49, the cleaning losses 50, the tailings flow rate 41 and the grain tailings fraction 37 are displayed. Symbols 52 can be associated with the individual displayed parameters, from which the nature of the respective individual displayed parameters 37, 41, 49, 50 is apparent, to make monitoring these parameters easier.

A still-to-be-described in detail controller 53 is associated with the processing and memory module 47, so that one or more operating condition parameters of at least one working part 45 can be controlled according to the tailings flow rate 41 and the grains return fraction 37 in a manner according to the process of the present invention. In the following control of the cleaning unit 14 in the working part 45 is described, in which the operating condition parameter(s) 54 to be controlled can be the cleaning blower speed 24, the upper sieve mesh 25 and/or the lower sieve mesh 26. For various embodiments within the scope of the present invention, for example in the case of an excessively high fraction of unthreshed ears in the crop tailings stream 31, the working part 45 to be controlled can be the threshing device 5 and the operating condition parameter 54 to be controlled can be threshing cylinder speed of one or more threshing cylinders.

The instantaneous values of the operating condition parameter 54 are transmitted to the controller 53 of the processing and memory module 47 so that control of the operating condition parameter 54 is possible. In the simplest case this can occur so that the cleaning blower 17 is associated with a known speed sensor 55, which determines the instantaneous value of the cleaning blower speed 24 and transmits it to the controller 53 as a cleaning blower speed signal O. Because the upper sieve mesh 25 and the lower sieve mesh 26 are usually adjusted in stages or steps, the upper sieve mesh signal P and the lower sieve mesh signal Q, which represent the respectively adjusted sieve meshes 25, 26, are transmitted to the controller 53. In this way it is guaranteed that the controller 53 can continuously acquire the instantaneous values O, P, Q of the operating condition parameter 54 and also the associated signals A, R, X, Y, Z of the different product or crop streams 12, 18, 20, 37, 41. In other embodiments within the scope of the present invention the different grain loss signals A, R could be combined into an unshown single grain loss signal.

Based on the considerably variable effect of a change of the different operating condition parameters 24 to 26 on the separating characteristics of a cleaning unit 14 in the combine harvester 1 control algorithms 56, 57, 58 stored in the controller 53 are editable to match the respective operating condition parameters 24 to 26. Crop specific parameters like the crop throughput, the crop type and the crop properties, for example the group moisture, act very differently on the required operating condition parameters 24 to 26. Thus in a preferred embodiment of the invention it is provided that the crop specific parameter 59 is considered in the control algorithms 56 to 58 in the controller 53 in such a way that the optimized operating condition parameters 24 to 26 are also determined depending on these harvested material or crop specific parameters 59.

The start or initialization of the controller 53 comprising the control algorithms 56 to 58 occurs in the simplest case when the operator of the combine harvester 1 activates the controller 53 by operating a switch 60 integrated in the input unit 46, whereby the instantaneous tailings flow rate 41 and grains return fraction 37 determined at the start form set values 61 of the control process and thus the working or operating point of the control process. The operator of the combine harvester 1 determines the instant at which operation of the controller 53 starts. In an advantageous further embodiment of the invention so that the operator can determine an optimum working point the operator of the combine harvester 1 performs a calibrating or verifying movement with approximately constant travel speed of the combine harvester 1 and/or with approximately constant crop throughput when the controller 53 is put into operation. The operator of the combine harvester can follow the course of the separator losses 49 and the cleaning losses 50 during this so-called verifying or test run. For that purpose in the simplest case the driver's or operator's cabin 62 can have an observation window 63 through which the operator can see into the grain stream 20 flowing into the grain tank 23. In this way it is possible for the operator to define the working point of the controller considering low grain losses 49, 50 and high grain cleanness, a so-called subjective cleanness horizon or zone. For this purpose the input unit 46 can be provided with additional operating elements 51, by which the operator can select the process control algorithms 56 to 58. In various other embodiments within the scope of the present invention this selection of the process control algorithms 56 to 58 is unnecessary when the controller 53 is programmed so that one or more of the control algorithms 56 to 58 automatically operate after its start, in order to achieve an efficient control of the operating condition parameter 54 at the defined set value 61.

Because the instantaneous tailings flow rate 41 and grains return fraction 37 react to changing boundary conditions, such as crop type and properties, earlier or sooner than the grain losses 49, 50 and the cleanness of the harvested grain stream 20, they can be employed as an early quasi-diagnosis system for avoiding excessive grain losses 49, 50 or increased uncleanness of the harvested grain stream 20. The efficiency of this early diagnosis system is considerably increased when the control algorithms 56 to 58 stored in the controller 53 consider the interaction between the operating condition parameter 54 to be optimized, the grain losses 49, 50 and the tailings flow rate 41 and the and grains tailings fraction 37 sufficiently precisely.

Figure 3:
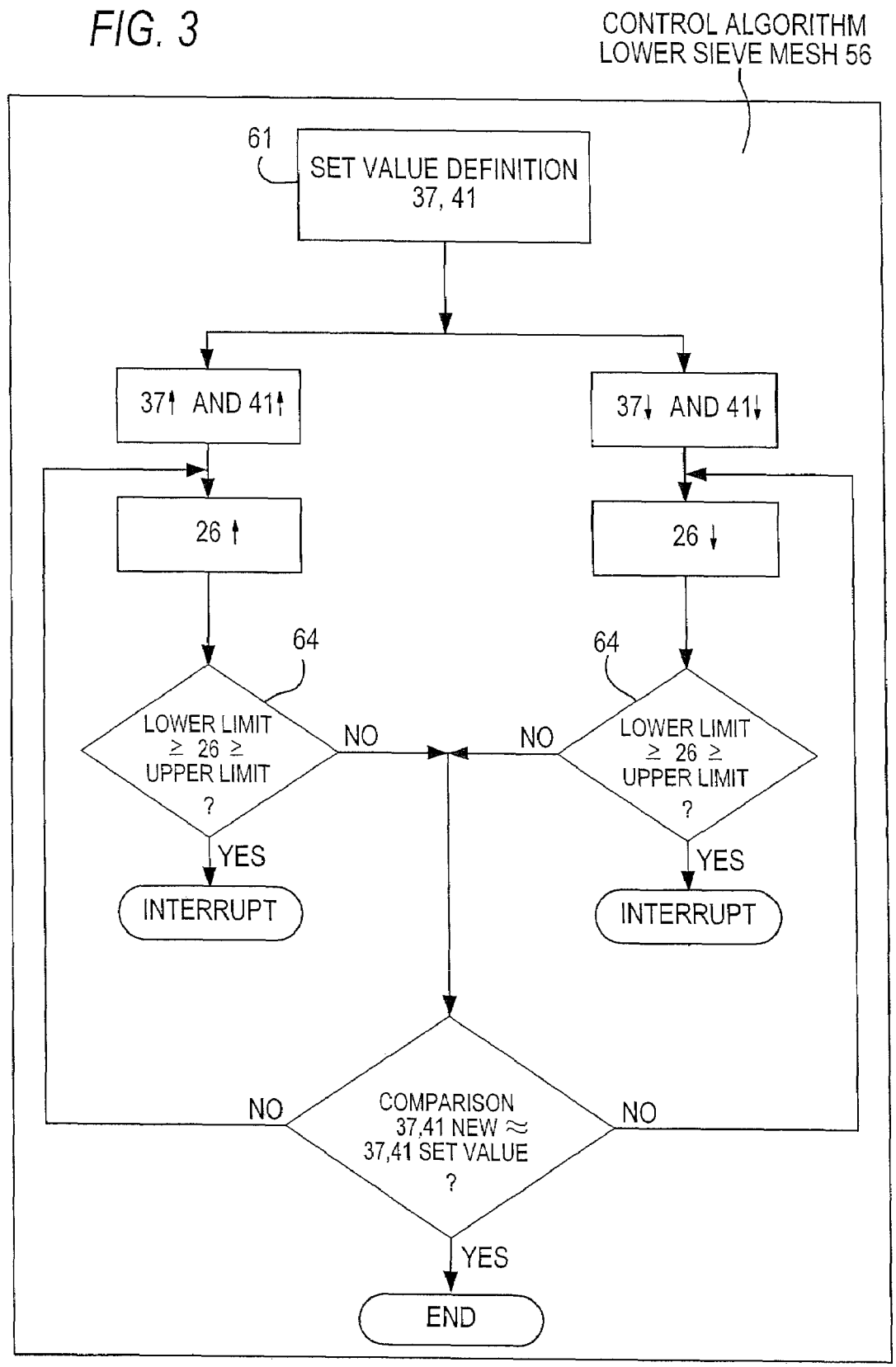
FIG. 3 is a flow chart of a control algorithm for the lower sieve mesh of a lower sieve in the separating unit used in the process for controlling operating condition parameters according to the invention.

An especially efficient optimization of the lower sieve mesh 26 results according to FIG. 3, when the control algorithm 56 for optimization of the lower sieve mesh 26 is set up so that increasing tailings flow rate 41 and increasing grain tailings fraction 37 lead to an increase of the lower sieve mesh 26 until the previously defined set values for the tailings flow rate 41 and the and grains return fraction 37 are reached again. Analogously with decreasing tailings flow rate 41 and decreasing grains return fraction 37 an efficient optimization of the lower sieve mesh 26 is then achieved when the lower sieve mesh 26 is reduced until the previously defined set values 61 for the tailings flow rate 41 and the grain tailings fraction 37 are reached.

Figure 4:
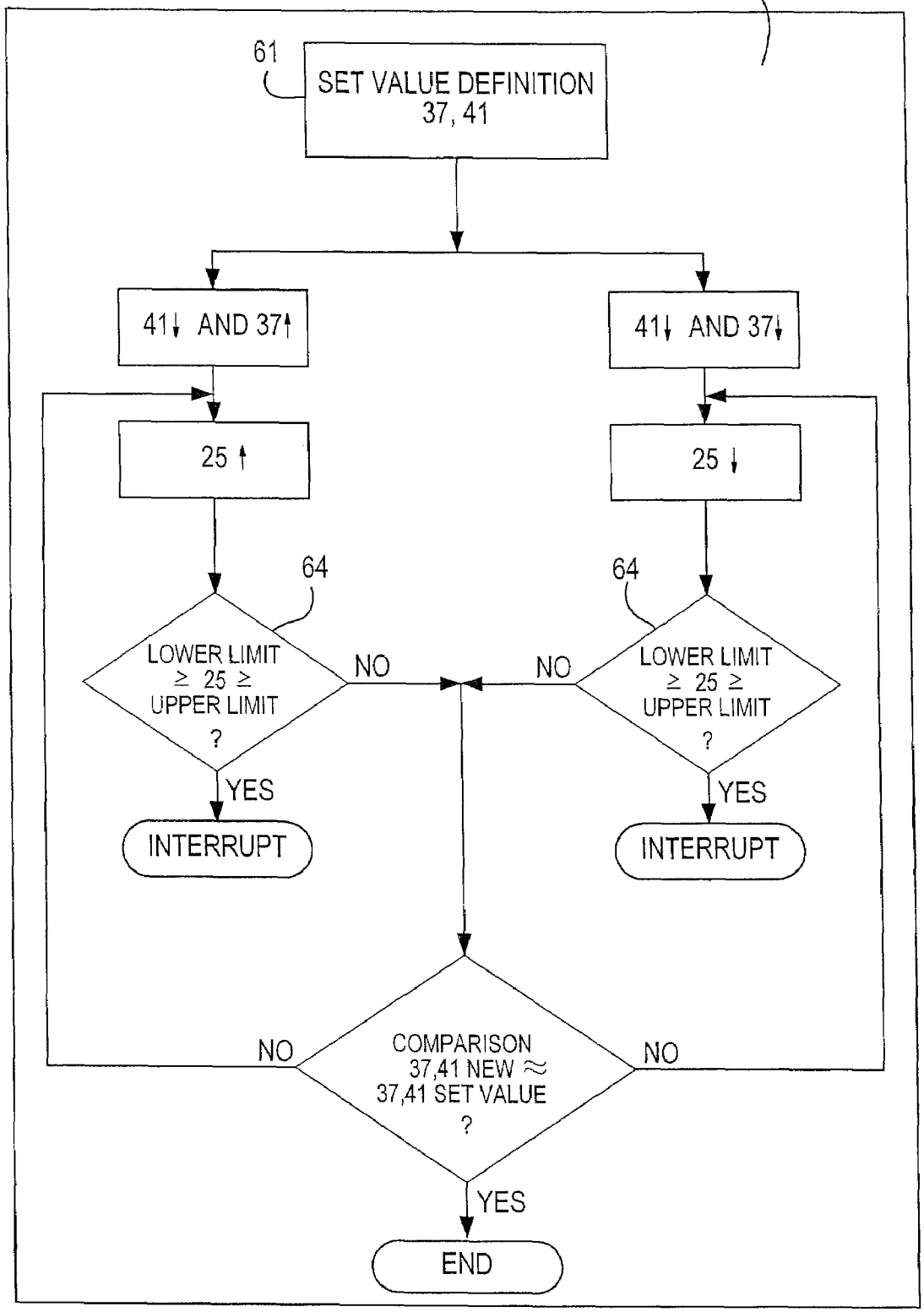
FIG. 4 is a flow chart of another control algorithm for the upper sieve mesh of an upper sieve in the separating unit used in the process for controlling operating condition parameters according to the invention.

A highly efficient optimization of the upper sieve mesh 25 is attained according to FIG. 4, when the required control algorithm 57 increases the upper sieve mesh 25 when tailings flow rate 41 decreases and the grain tailings fraction 37 increases, and vice versa, with increasing tailings flow rate 41 and decreasing grain tailings fraction 37, i.e. the control algorithm decreases upper sieve mesh 25 with increasing tailings flow rate 41 and decreasing grain tailings fraction 37 until the previously defined set values 61 for the tailings flow rate 41 and the grain tailings fraction 37 are reached.

Figure 5:
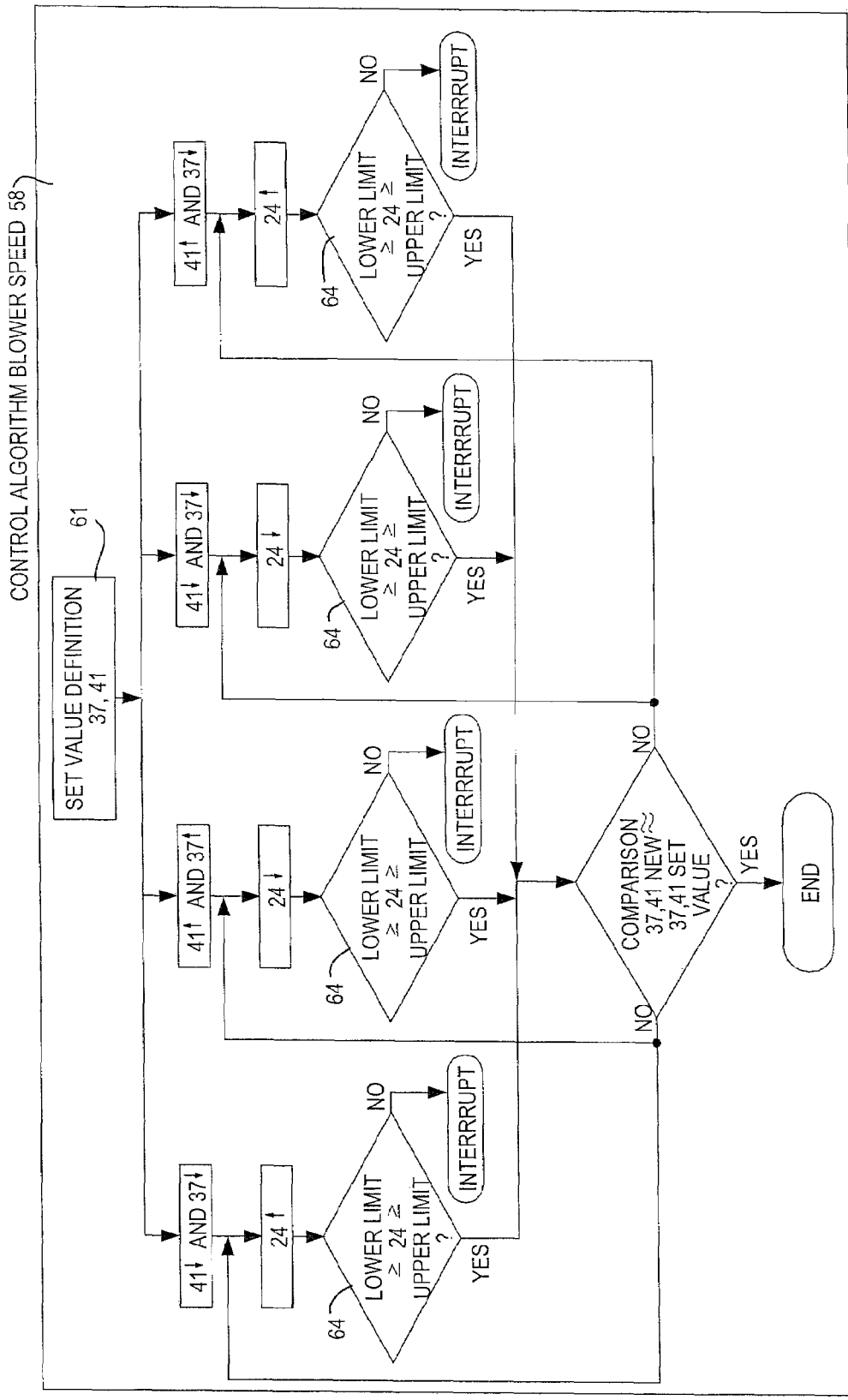
FIG. 5 is a flow chart of another control algorithm for the cleaning blower speed of a blower in the separating unit used in the process for controlling operating condition parameters according to the invention.

An efficient control algorithm 58 for optimization of the cleaning blower speed 24 results according to FIG. 5, when the control algorithm 58 increases the cleaning blower speed 24 when the tailings flow rate 41 is decreasing and the grain tailings fraction 37 is increasing, decreases the cleaning blower speed 24 with both tailings flow rate 41 and grain tailings fraction 37 increasing, decreases the blower speed 24 with both tailings flow rate 41 and grain tailings fraction 37 decreasing; and increases blower speed 24 when the tailings flow rate 41 is increasing and the grain tailings fraction 27 is decreasing, until the determined set values 61 for tailings flow rate 41 and grains tailings fraction 37 are again reached.

In an advantageous embodiment of the invention additional operating elements 66 are provided on the input unit 46, by which the operator can input optimized operating condition parameters 54 determined by the control algorithms 56 to 58, so that the appropriate devices 15, 16, 17 of the cleaning unit 14 can be adjusted in a known and not further described manner. In other embodiments within the scope of the present invention the controller 53 acts without including the operator in this adjustment process to automatically adjust the optimized operating condition parameters 54. So that the controller does not over supply the adjusting mechanism of the cleaning unit 14 for example with strongly fluctuating crop throughput and properties, the controller 53 in the simplest case can be shut off by operating the starting switch 60. The control must be limited to significant values for the different operating condition parameters 54 to be optimized. In the simplest case that can occur when limiting values 64 for the different operating condition parameters 54 are provided for the control algorithms 56 to 58, which no longer intervene with the tailings flow rate 41 and grains return fraction 37 when the upper and lower limits of the operating condition parameters 54 are exceeded or passed. Disturbance signaling variables 65 and associated tolerance ranges are stored in the control algorithms 56 to 58 according to FIG. 2 based on the same considerations. The control process is interrupted when the disturbance signaling variables 65 are exceeded and the operator is acoustically or visually notified and required to define a new operating or working point. The disturbance signaling variables 65 for example can be harvested crop properties, the ratio of grain throughput to tailings rate and the ratio of grain throughput to crop layer height.

Within the scope of the present control process and associated control device according to the invention various changes and substitutions can be made in order to achieve the desired described effects, within the scope of the present invention.

| PART LIST | |
|---|---|
| 1 | Combine harvester |
| 2 | Cutter head |
| 3 | Feed rake |
| 4 | Crop stream |
| 5 | Threshing device |
| 6 | Partial crop stream |
| 7 | Shaker tray |
| 8 | Separating unit |
| 9 | Partial crop stream |
| 10 | Return pan |
| 11 | Grain pan |
| 12 | Separate waste or losses |
| 13 | Harvested crop flow |
| 14 | Cleaning unit |
| 15 | Upper sieve |
| 16 | Lower sieve |
| 17 | Cleaning blower |
| 18 | Cleaning losses |
| 19 | Goods stream |
| 20 | Grain stream |
| 21 | Feed screw device |
| 22 | Grain elevator |
| 23 | Grain tank |
| 24 | Blower speed |
| 25 | Upper sieve mesh |
| 26 | Lower sieve mesh |
| 27 | Upper sieve plate |
| 28 | Lower sieve plate |
| 29 | Sieve surface, upper sieve |
| 30 | Sieve surface, lower sieve |
| 31 | Crop tailings stream |
| 32 | Guide surface |
| 33 | Crop screw conveyor |
| 34 | Grain elevator |
| 35 | Tailings unit |
| 36 | Grain flow measuring device |
| 37 | Tailings grain fraction |
| 38 | Sensor rod or bar |
| 39 | Evaluating and display unit |
| 40 | Volume flow rate sensing device |
| 41 | Tailings flow rate |
| 42 | Volume flow rate sensing device |
| 43, 44 | Grain loss sensor |
| 45 | Working part |
| 46 | Input modules |
| 47 | Processing and memory module |
| 48 | Display unit |
| 49 | Separator losses |
| 50 | Cleaning losses |
| 51 | Operating element |
| 52 | Symbol |
| 53 | controller |
| 54 | Operating condition parameter |
| 55 | Speed sensor |
| 56-58 | Control algorithms |
| 59 | Crop specific parameter |
| 60 | Switch |
| 61 | Set value |
| 62 | Driver's cabin |
| 63 | Observation window |
| 64 | Limiting values |
| 65 | Disturbance variable |
| 66 | Additional operating elements |
| A | Separator loss signal |
| O | Blower speed signal |
| P | Upper sieve mesh signal |
| Q | Lower sieve mesh signal |
| R | Cleaning loss signal |
| X | grain tailings signal |
| Y | Tailings flow rate signal |
| Z | Grain signal |

The disclosure in German Patent Application 103 60 597.5 of Dec. 19, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process and device for controlling working parts of a combine harvester, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A device for controlling one or more operating condition parameters of combine harvester working parts including a threshing device, a separating unit associated with the threshing device, at least one cleaning unit including cleaning parts, and at least one tailings unit for working connection of the at least one cleaning unit with the threshing device, the device for controlling one or more operating condition parameters comprising
an evaluating and display unit (39);
at least one sensing device (36, 40) for monitoring a crop tailings stream (31) of the at least one tailings unit, generating tailings stream signals (X, Y), and transmitting the tailings stream signals (X, Y) to the evaluating and display unit (39);
at least one grain loss sensor (43, 44) generating at least one grain loss signal (A, R) and transmitting the at least one grain loss signal (A, R) to the evaluating and display unit (39); and
at least one controller (53) for controlling said one or more operating condition parameters (54) according to set values of said tailings stream signals (X, Y) and according to the at least one grain loss signal (A, R) in order to optimize said one or more operating condition parameters.

2. The device as defined in claim 1, wherein said at least one cleaning unit (14) comprises a cleaning blower (17), an upper sieve (15) and a lower sieve (47), and said controller is configured for operating condition parameters (54) that include a cleaning blower speed (24), an upper sieve mesh (25) and a lower sieve mesh (26).

3. The device as defined in claim 2, wherein said at least one grain loss sensor (43, 44) includes sensor elements monitoring grain losses that include separator losses (49) and cleaning losses (50).

4. The device as defined in claim 3, wherein said at least one controller (53) includes control algorithms (56-58) for optimizing said one or more operating condition parameters.

5. The device as defined in claim 4, wherein said at least one sensing device (36, 40) is configured to generate said tailings stream signals (X, Y) that measure tailings grain fraction (37) and tailings flow rate (41) of said tailings stream (31), and wherein said at least one controller (53) is configured so that a first (56) of said control algorithms generates control signals to increase said lower sieve mesh (26) when said tailings grain fraction (37) and said tailings flow rate (41) both increase and to decease said lower sieve mesh (26) when said tailings grain fraction (37) and said tailings flow rate (41) both decrease, until predetermined set values (61) for said tailings grain fraction (37) and said tailings flow rate (41) are reached, in order to optimize said lower sieve mesh (26).

6. The device as defined in claim 4 or 5, wherein said at least one sensing device (36, 40) is configured to generate said tailings stream signals (X, Y) that measure tailings grain fraction (37) and tailings flow rate (41) of said tailings stream (31), and wherein said at least one controller (53) is configured so that a second (57) of said control algorithms generates control signals to decrease said upper sieve mesh (25) when said tailings grain fraction (37) decreases and said tailings flow rate (41) increases and to increase said upper sieve mesh (25) when said tailings grain fraction (37) increases and said tailings flow rate (41) decreases, until predetermined set values (61) for said tailings grain fraction (37) and said tailings flow rate (41) are reached, in order to optimize said upper sieve mesh (25).

7. The device as defined in claim 4, wherein said at least one sensing device (36, 40) is configured to generate said tailings stream signals (X, Y) that measure tailings grain fraction (37) and tailings flow rate (41) of said tailings stream (31), and wherein said at least one controller (53) is configured so that a third (58) of said control algorithms generates control signals to decrease said blower speed (24) when said tailings grain fraction (37) decreases and said tailings flow rate (41) decreases and to increase said blower speed (24) when said tailings grain fraction (37) decrease and said tailings flow rate (41) increases, until predetermined set values (61) for said tailings grain fraction (37) and said tailings flow rate (41) are reached, in order to optimize said blower speed (24).

8. The device as defined in claim 4 or 5, wherein said at least one sensing device (36, 40) is configured to generate said tailings stream signals (X, Y) that measure tailings grain fraction (37) and tailings flow rate (41) of said tailings stream (31), and wherein said at least one controller (53) is configured so that a third (58) of said control algorithms generates control signals to decrease said blower speed (24) when said tailings grain fraction (37) decreases and said tailings flow rate (41) decreases and to increase said blower speed (24) when said tailings grain fraction (37) decreases and said tailings flow rate (41) increases, until predetermined set values (61) for said tailings grain fraction (37) and said tailings flow rate (41) are reached, in order to further optimize said blower speed (24).

\* \* \* \* \*